(12) United States Patent
Fukuroi

(10) Patent No.: US 6,865,798 B2
(45) Date of Patent: Mar. 15, 2005

(54) METHOD FOR SHAPING AIR BEARING SURFACE OF MAGNETIC HEAD SLIDER

(75) Inventor: Osamu Fukuroi, Kwai Chung (HK)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 275 days.

(21) Appl. No.: 10/143,951

(22) Filed: May 14, 2002

(65) Prior Publication Data

US 2002/0170164 A1 Nov. 21, 2002

(30) Foreign Application Priority Data

May 18, 2001 (JP) ........................................ 2001/149212

(51) Int. Cl.$^7$ .......................... G11B 5/127; H04R 31/00
(52) U.S. Cl. ............................... 29/603.07; 29/603.09; 29/603.12; 29/603.14; 29/603.16; 29/603.18; 29/417; 156/268; 156/344; 216/65; 438/455; 438/458; 438/967; 360/230; 360/237.1
(58) Field of Search ...................... 29/603.07, 603.09, 29/603.12–18, 417; 156/268, 344; 216/65; 438/455, 458, 967; 360/230–237.1

(56) References Cited

U.S. PATENT DOCUMENTS

| | | | |
|---|---|---|---|
| 5,159,508 A | * 10/1992 | Grill et al. | 360/235.2 |
| 5,266,769 A | 11/1993 | Deshpande et al. | 219/121.69 |
| 5,527,744 A | * 6/1996 | Mignardi et al. | 216/2 |
| 5,713,123 A | * 2/1998 | Toyoda et al. | 29/603.12 |
| 5,903,460 A | * 5/1999 | Syouji et al. | 700/117 |
| 5,972,234 A | * 10/1999 | Weng et al. | 216/44 |

FOREIGN PATENT DOCUMENTS

JP       08124116 A   * 5/1996 ............ G11B/5/31

OTHER PUBLICATIONS

"Floating thin film head fabricated by ion etching method"; Nakanishi, T.; Kogure, K.; Toshima, T.; Yanagisawa, K.; Magnetics, IEEE Transactions on, vol.: 16, Issue: 5, Sep. 1980; pp.: 785–787.*

* cited by examiner

*Primary Examiner*—Paul D Kim
(74) *Attorney, Agent, or Firm*—Armstrong, Kratz, Quintos, Hanson & Brooks, LLP

(57) ABSTRACT

A method for shaping an ABS of a magnetic head slider including a step of holding at least one row bar with a plurality of aligned thin-film magnetic head elements by adhering a first surface of the at least one row bar to an adhesive or UV tape capable of passing a laser beam there through, the first surface being opposite an ABS of the at least one row bar, a step of shaping the ABS of the at least one row bar in a convex shape by radiating a laser beam to the first surface of the at least one row bar through the adhesive or UV tape, a step of cutting the at least one row bar into individual magnetic head sliders, and a step of then, removing the magnetic head sliders from the adhesive or UV tape after weakening adhesion properties of the adhesive or UV tape.

12 Claims, 6 Drawing Sheets

METHOD FOR SHAPING AIR BEARING SURFACE OF MAGNETIC HEAD SLIDER

FIELD OF THE INVENTION

The present invention relates to a method for finally shaping an air bearing surface (ABS) of a magnetic head slider and a manufacturing method of a magnetic head slider using this shaping method.

DESCRIPTION OF THE RELATED ART

A flying magnetic head slider with a thin-film magnetic head is required to have a slightly convex shape such as convex crown and/or camber in an ABS of each rail in order to obtain an excellent flying performance. The "crown" represents a deformation in shape along fore-and-aft directions of the magnetic head slider or directions in parallel with an air-flowing direction, and the "camber" represents a deformation in shape along lateral directions of the magnetic head slider or directions perpendicular to the air-flowing direction. In some cases, the crown and the camber may be generically called as the crown.

The ABS with such convex shape is formed in a final shaping work after various works for a row bar provided with a plurality of aligned magnetic head sliders. Namely, in this final work, the ABS is shaped to be convex by radiating a laser beam to a surface opposite to the ABS of the row bar so as to intentionally deform this row bar (U.S. Pat. No. 5,266,769).

However, in the conventional final shaping work, because the row bar is caught by a jig for holding, chipping of the row bar or contamination thereof may occur.

Also, if the row bar is cut and separated into individual magnetic head sliders after the shaping of the ABS to be convex, the convex ABS may be deformed because of a distortion produced during the cutting. Thus, a desired flying performance cannot be expected.

If the shaping of the ABS to be convex is executed after the cutting of the row bar into individual magnetic head sliders, the latter problem will not occur. However, in this case, a positioning of each magnetic head slider for the convex shaping and a measurement of a crown amount or a height of the crest from the root of the convex shape are very difficult. Particularly, in the case of a downsized magnetic head slider referred to as a 30% slider with a size of 1.0 mm×1.235 mm×0.3 mm or a 20% slider with a size of 0.7 mm×0.85 mm×0.23 mm, it is quite difficult to easily and accurately execute the positioning of each magnetic head slider and the measurement of a crown amount. As will be noted, during or after the shaping of the ABS into convex, it is required to measure the crown amount to control a shaping amount.

SUMMARY OF THE INVENTION

It is therefore an object of the present invention to provide a method for finally shaping an ABS of a magnetic head slider and a manufacturing method of a magnetic head slider using this shaping method, whereby occurrence of chipping and contamination of the magnetic head slider can be reduced.

Another object of the present invention is to provide a method for finally shaping an ABS of a magnetic head slider and a manufacturing method of a magnetic head slider using this shaping method, whereby an ABS of the magnetic head slider can be easily and accurately shaped into a desired convex shape.

According to the present invention, a method for shaping an ABS of a magnetic head slider includes a step of holding at least one row bar with a plurality of aligned thin-film magnetic head elements by adhering a first surface of the at least one row bar to an adhesive tape capable of passing a laser beam there through, the first surface being opposite an ABS of the at least one row bar, a step of shaping the ABS of the at least one row bar in a convex shape by radiating a laser beam to the first surface of the at least one row bar through the adhesive tape, a step of cutting the at least one row bar into individual magnetic head sliders, and a step of then removing the magnetic head sliders from the adhesive tape after weakening adhesion properties of the adhesive tape by, for example, heating the tape.

Because the shaping of the ABS of the row bars is executed while the row bars are adhered and held by the adhesive tape, no chipping of the row bars nor contamination thereof can occur.

It is preferred that the cutting step includes cutting at least one row bar into individual magnetic head sliders so that the adhesive tape holds all of the individual magnetic head sliders. It is also preferred that the method includes a step of measuring a crown amount of each magnetic head slider after the cutting step but before the removing step. Because a crown amount of the magnetic head slider is measured under a state in which all the sliders are held by the adhesive tape, a precise measurement can be extremely easily performed.

It is further preferred that the holding step includes holding a single row bar with a plurality of aligned thin-film magnetic head elements by adhering the first surface of the row bar to the adhesive tape, or holding a plurality of row bars, each having a plurality of aligned thin-film magnetic head elements, by adhering the first surface of each of the row bars to the adhesive tape.

Also, according to the present invention, a method for shaping an air bearing surface of a magnetic head slider includes a step of holding at least one row bar with a plurality of aligned thin-film magnetic head elements by adhering a first surface of the at least one row bar to an adhesive tape capable of passing a laser beam therethrough, the first surface being opposite to an ABS of the at least one row bar, a step of cutting the at least one row bar into individual magnetic head sliders so that the adhesive tape holds all of the individual magnetic head sliders, a step of shaping an ABS of the individual magnetic head slider in a convex shape by radiating a laser beam to the first surface of the magnetic head slider through the adhesive tape, and a step of then, removing the magnetic head sliders from the adhesive tape after weakening adhesion properties of the adhesive tape.

Because the shaping of the ABS of the row bars is executed while the row bars are adhered and held by the adhesive tape, no chipping of the row bars nor contamination thereof can occur. In addition, because the convex shape is formed after cutting into the individual magnetic head sliders, no deformation in crown resulting from distortion that may occur during the dicing process of the row bar into the individual magnetic head sliders will be produced. Also, because all the magnetic head sliders are held in the fixing state to the adhesive tape, the positioning of each magnetic head slider for the convex shaping can be precisely and easily performed.

It is preferred that the method includes a step of measuring a crown amount of each magnetic head slider after the cutting step but before the removing step. Because a crown amount of the magnetic head slider is measured under the state where all the sliders are held by the adhesive tape, a precise measurement can be extremely easily performed.

It is further preferred that the holding step includes holding a single row bar with a plurality of aligned thin-film magnetic head elements by adhering the first surface of the row bar to the adhesive tape, or holding a plurality of row bars, each having a plurality of aligned thin-film magnetic head elements, by adhering the first surface of each of the row bars to the adhesive tape.

According to the present invention, further, a method for shaping an ABS of a magnetic head slider includes a step of holding at least one row bar with a plurality of aligned thin-film magnetic head elements by adhering a first surface of the at least one row bar to a UV tape capable of passing a laser beam there through, the first surface being opposite an ABS of the at least one row bar, a step of shaping the ABS of the at least one row bar into a convex shape by radiating a laser beam to the first surface of the at least one row bar through the UV tape, a step of cutting the at least one row bar into individual magnetic head sliders, and a step of then removing the magnetic head sliders from the UV tape after radiating an ultra violet light to the UV tape so as to weaken its adhesion properties.

Because the shaping of the ABS of the row bars is executed while the row bars are adhered and held by the UV tape, no chipping of the row bars nor contamination thereof can occur.

It is preferred that the cutting step includes cutting at least one row bar into individual magnetic head sliders so that the UV tape holds all of the individual magnetic head sliders. It is also preferred that the method includes a step of measuring a crown amount of each magnetic head slider after the cutting step but before the removing step. Because a crown amount of the magnetic head slider is measured under the state where all the sliders are held by the UV tape, a precise measurement can be easily performed.

It is further preferred that the holding step includes holding a single row bar with a plurality of aligned thin-film magnetic head elements by adhering the first surface of the row bar to the UV tape, or holding a plurality of row bars, each having a plurality of aligned thin-film magnetic head elements, by adhering the first surface of each of the row bars to the UV tape.

Also, according to the present invention, a method for shaping an ABS of a magnetic head slider includes a step of holding at least one row bar with a plurality of aligned thin-film magnetic head elements by adhering a first surface of the at least one row bar to a UV tape capable of passing a laser beam therethrough, the first surface being opposite an ABS of the at least one row bar, a step of cutting the at least one row bar into individual magnetic head sliders so that the UV tape holds all of the individual magnetic head sliders, a step of shaping an ABS of the individual magnetic head slider into a convex shape by radiating a laser beam to the first surface of the magnetic head slider through the UV tape, and a step of then removing the magnetic head sliders from the UV tape after radiating an ultra violet light to the UV tape so as to weaken its adhesion properties.

Because the shaping of the ABS of the row bars is executed while the row bars are adhered and held by the UV tape, no chipping of the row bars nor contamination thereof are occurred. In addition, because the convex shape is formed after cutting into the individual magnetic head sliders, no deformation in crown resulting from distortion that may occur during the dicing process of the row bar into the individual magnetic head sliders will be produced. Also, because all the magnetic head sliders are held in the fixing state to the UV tape, the positioning of each magnetic head slider for the convex shaping can be easily performed.

It is preferred that the method includes a step of measuring a crown amount of each magnetic head slider after the cutting step but before the removing step. Because a crown amount of the magnetic head slider is measured under the state where all the sliders are held by the UV tape, a precise measurement can be easily performed.

It is further preferred that the holding step includes holding a single row bar with a plurality of aligned thin-film magnetic head elements by adhering the first surface of the row bar to the UV tape, or holding a plurality of row bars, each having a plurality of aligned thin-film magnetic head elements, by adhering the first surface of each of the row bars to the UV tape.

Further, according to the present invention, a manufacturing method of a magnetic head slider includes a step of dicing an wafer on which many of thin-film magnetic head elements are fabricated to obtain a plurality of row bars each having a plurality of aligned thin-film magnetic head elements, a step of forming ABSs of magnetic head sliders on one surface of the each row bar, and the above-mentioned steps for shaping the ABS of each magnetic head slider.

Further objects and advantages of the present invention will be apparent from the following description of the preferred embodiments of the invention as illustrated in the accompanying drawings.

DESCRIPTION OF THE PREFERRED EMBODIMENTS

Figure 1:
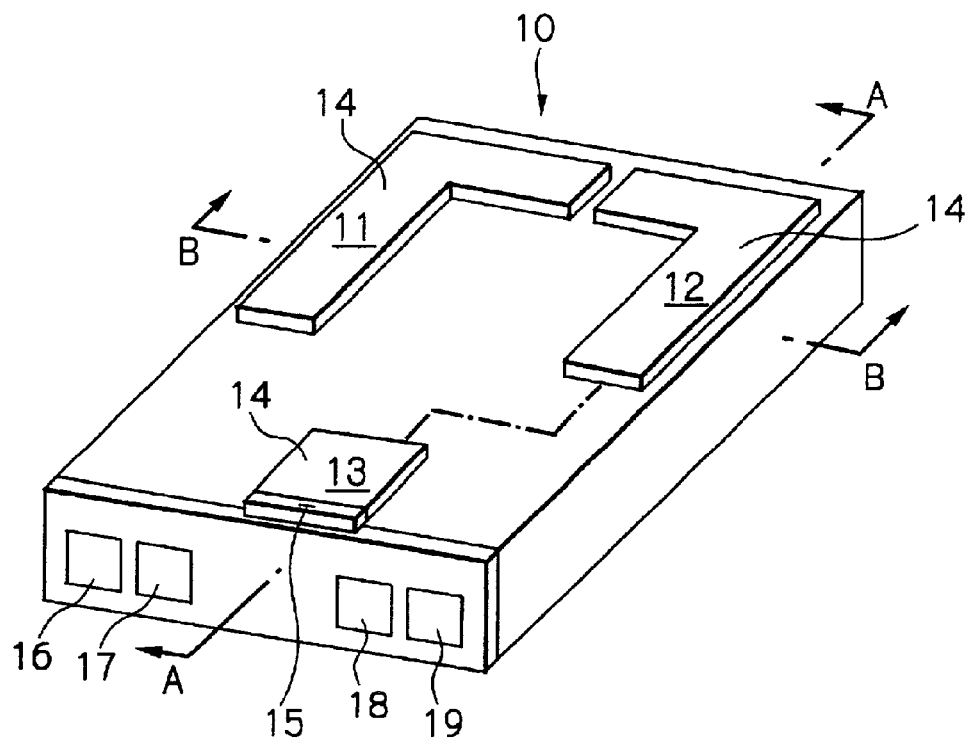
FIG. 1 shows an oblique view schematically illustrating an example of a magnetic head slider fabricated by a manufacturing method according to the present invention.
Figure 2:
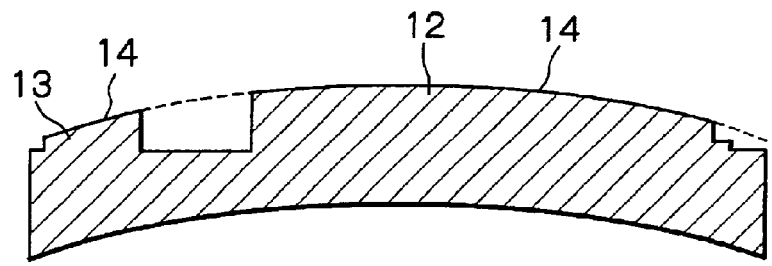
FIG. 2 shows a sectional view seen from an A—A line of FIG. 1.
Figure 3:
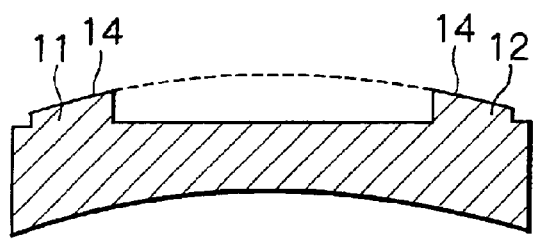
FIG. 3 shows a sectional view seen from a B—B line of FIG. 1.

FIG. 1 schematically illustrates an example of a magnetic head slider fabricated by a manufacturing method according to the present invention, FIG. 2 is a sectional view seen from an A—A line of FIG. 1, and FIG. 3 is a sectional view seen from a B—B line of FIG. 1.

In FIG. 1, reference numerals 11 and 12 denote two side rails of a flying type magnetic head slider 10, 13 denotes a rear rail of the magnetic head slider 10, 14 denotes slider ABSs formed on surfaces of the side rails 11 and 12 and the rear rail 13 of the slider, 15 denotes a thin-film magnetic head element partially appeared on the ABS of the rear rail 14, and 16–19 denote electrode terminals electrically connected to the magnetic head element 15, respectively.

As slightly exaggerated for purposes of illustration in FIGS. 2 and 3, the magnetic head slider 10 is worked to have a slightly convex shape such as convex crown and/or camber in the ABS 14 of each rail in order to obtain an excellent flying performance.

Figure 4:
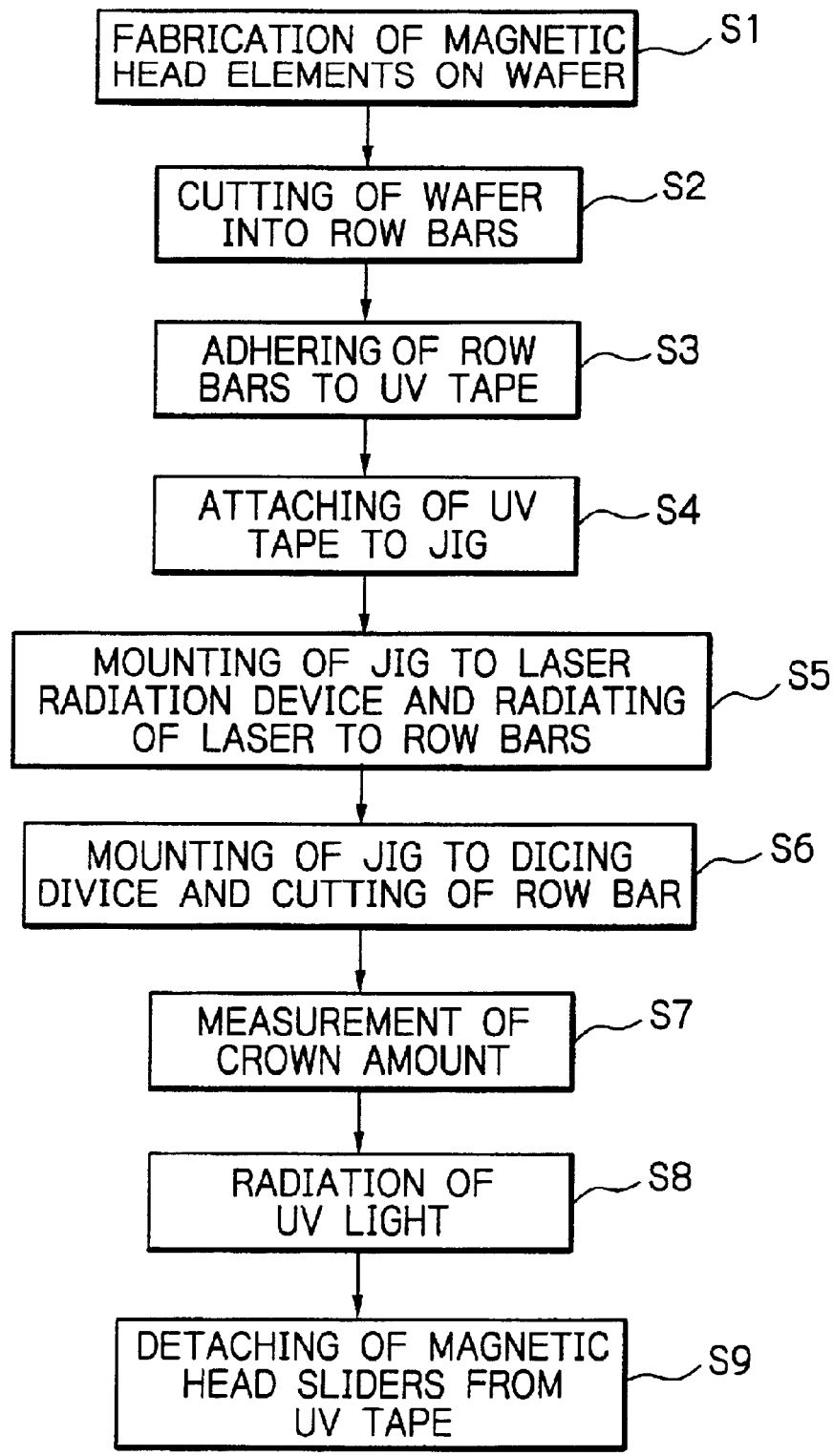
FIG. 4 shows a flow chart schematically illustrating a manufacturing method of a magnetic head slider as a preferred embodiment according to the present invention.

FIG. 4 schematically illustrates a manufacturing method of a magnetic head slider as a preferred embodiment according to the present invention. Hereinafter, a method for shaping an ABS of the magnetic head slider into a convex shape and a manufacturing process of the magnetic head slider will be described with reference to the figure.

First, many magnetic head elements arranged in a matrix are fabricated on a wafer by using a thin-film fabrication technique (step S1). This wafer process for fabricating the thin-film magnetic head elements can be performed by using various known methods.

Then, the wafer is cut into a plurality of row bars each of which has a plurality of aligned thin-film magnetic head elements (step S2).

Figure 5:
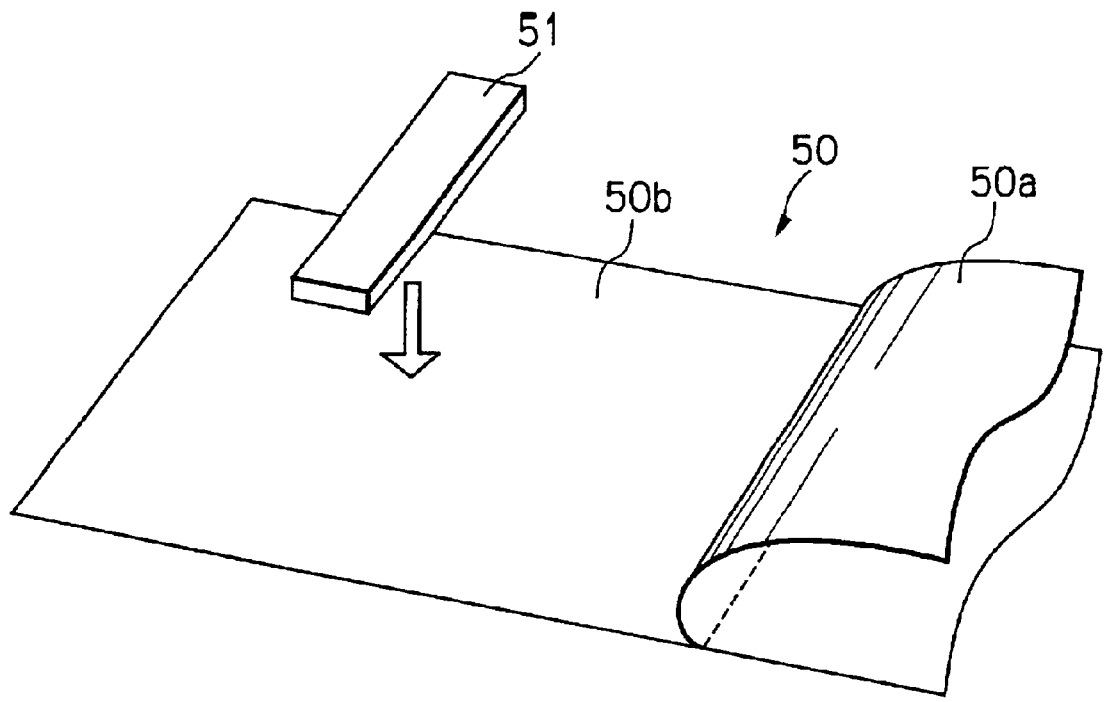
FIG. 5 shows an oblique view illustrating an adhering step of a row bar to a UV tape.

Then, the plurality of row bars are adhered and fixed to a UV tape (step S3). This adhesion is performed by adhering a surface opposite the ABS of the row bar to the UV tape. The UV tape has, in general, a three-layer structure of a base film, a UV-curing adhesive layer that will be cured by radiation of an ultra violet light and a peel-off film. As shown in FIG. 5, first, the peel-off film 50a is removed from the UV tape 50 and then the row bars 51 are stuck to the exposed adhesive layer 50b. It is important to press the UV tape against the stuck row bars so that air bubbles remain between the row bars and the UV tape.

Next, the UV tape 50 with the stuck row bars 51 is attached to a fixing jig used for a laser radiation process and a cutting or dicing process (step S4).

Figure 6:
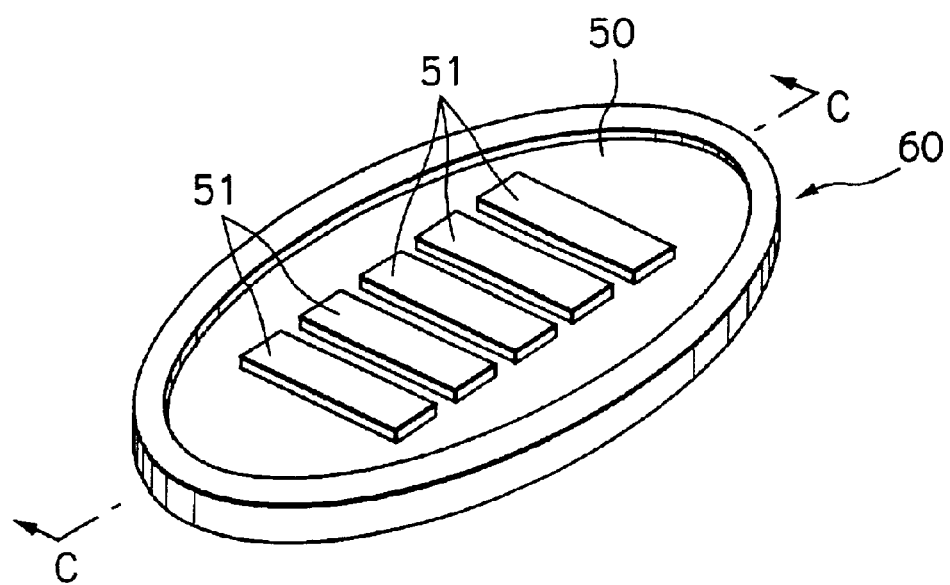
FIG. 6 shows an oblique view illustrating an example of a fixing jig on which a UV tape with a plurality of row bars is attached.
Figure 7:
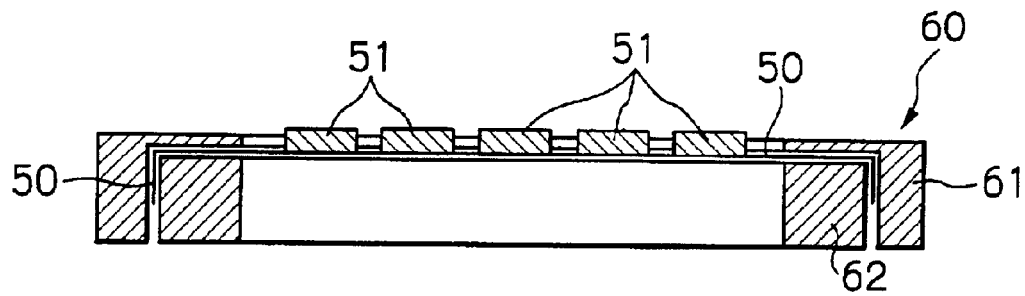
FIG. 7 shows a sectional view seen from a C—C line of FIG. 6.

FIG. 6 illustrates an example of this fixing jig with the attached UV tape, and FIG. 7 is a sectional view seen from a C—C line of FIG. 6.

As shown in these figures, the fixing jig 60 consists of a base frame 61 shaped in a circular loop, for example, and a cover frame 62 also shaped in the circular loop and used in contact with the base frame 61. The fixing jig 60 holds or supports the UV tape 50 with the stuck row bars 51 by pinching the margins of the UV tape 50 between the base frame 61 and the cover frame 62. Thus, the row bars 51 will be tightly supported by the stretched UV tape 50.

Then, the fixing jig 60 is mounted on a laser radiation device and a laser beam is radiated to surfaces opposite the ABSs of the row bars via the UV tape (step S5).

Figure 8:
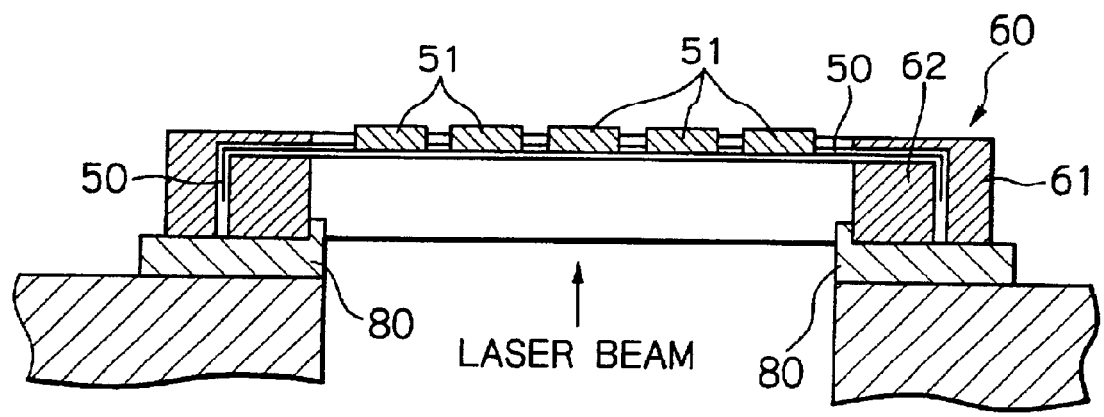
FIG. 8 shows a sectional view of the fixing jig mounted on a laser radiation device.

FIG. 8 illustrates the fixing jig 60 mounted on a table of the laser radiation device and the row bars 51 to which the laser beam is applied from rear side of the UV tape 50. Tackiness or adhesion properties of the adhesive layer of the UV tape 50 will not change even if the laser beam is radiated. The UV tape 50 will not absorb the laser beam but it will instead pass therethrough and therefore the radiated laser beam will be applied to the surface of the row bars 51, which is opposite the ABS. By applying the laser beam to only the surface opposite the ABS, this surface is partially and momentarily heated and melted to produce a stress in this surface only. Therefore, there occurs a difference in stresses between the opposite surface and the ABS, and then a convex shape such as a convex crown and/or camber shown in FIGS. 2 and 3 is formed in each row bar.

Any kind of laser source can be used if it is possible to partially heat and melt the rear surface of the row bar. In the case in which the laser beam is a spot beam with a small diameter, the laser beam will be moved to scan the row bars in longitudinal directions, lateral directions or slanting directions. In case of a relatively large diameter laser beam, these row bars will be radiated all at once.

Thereafter, the fixing jig is detached from the laser radiation device and then mounted on a dicing device, so that each row bar is cut and separated into individual magnetic head sliders (step S6).

Figure 9:
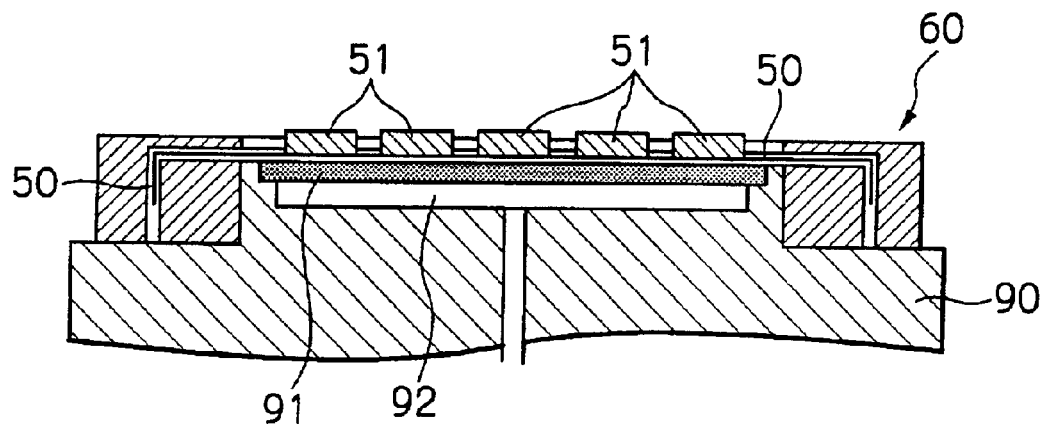
FIG. 9 shows a sectional view of the fixing jig mounted on a cutter device.

FIG. 9 illustrates the fixing jig 60 mounted on a working table 90 of the dicing device. The working table 90 has a vacuum chuck 93 with a porous chuck 91 and a vacuum chamber 92. The fixing jig 60 is attached on this working table 90 and the rear surface of the UV tape 50 is sucked through the porous chuck 91 to uniformly support the entire area of the UV tape. Under this state, the row bar 51 is cut and separated into individual magnetic head sliders.

Figure 10A:
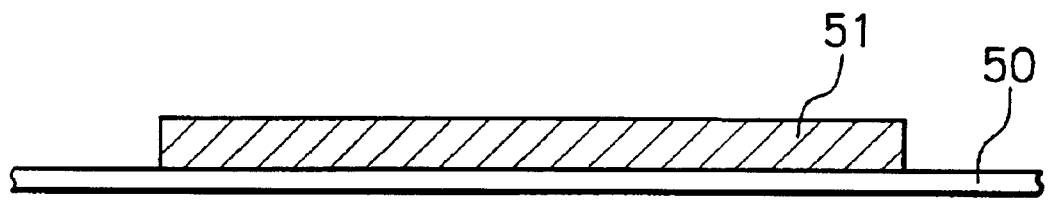
FIGS. 10a and 10b show sectional views illustrating the row bar adhered on the UV tape before cutting and after cutting.
Figure 10B:
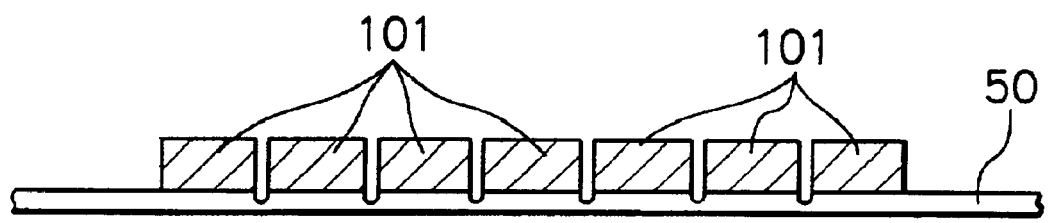

FIGS. 10a and 10b illustrate the row bar 51 adhered on the UV tape 50. FIG. 10a indicates the row bar prior to cutting and FIG. 10b indicates the row bar after cutting. As shown in FIG. 10b, when cutting the row bar 51, the UV tape 50 will not completely cut along its thickness but a part of the UV tape will remain connected. Thus, ail the magnetic head sliders 101 will be held in a fixing state to the fixing jig 60 through the UV tape 50.

Then, if necessary, a crown amount of each magnetic head slider is measured (step S7). The crown amount that corresponds to a height of the crest from the root of the convex shape in the ABS of the magnetic head slider will be optically measured. In order to execute this measurement, it is required that each magnetic head slider is precisely positioned on a measurement stage without inclining. In this embodiment, because all the magnetic head sliders are held in the fixing state to the UV tape, the positioning will be automatically completed and therefore extremely easy and precise measurement of the crown amount can be expected. This is, in particular, advantageous for a downsized magnetic head slider such as a 20% slider or a 30% slider. Also, because a crown amount of each magnetic head slider, and not a crown amount of each row bar, can be measured, influence of a distortion that might occur during the dicing process of the row bar into the individual magnetic head sliders can be omitted from the measured amount. Furthermore, because of using of a thin UV tape with a thickness of about 100 $\mu$m, a distortion that may be produced at adhesion of the row bars to this UV tape will be absorbed by the UV tape itself and the magnetic head slider will be unaffected by the possible distortion. As a result, a flatness of the ABS will not change before and after the adhesion and, thus, a precise crown amount can be measured.

Thereafter, an ultraviolet light is radiated to the rear surface of the UV tape 50 to cure the adhesion layer of this UV tape (step S8).

As a result of the curing of the adhesion layer, the adhesion properties of the UV tape will be weakened, and then the magnetic head sliders 101 are detached from the UV tape 50 (step S9).

As aforementioned, according to this embodiment, because the shaping of the ABS of the row bars are executed while the row bars is adhered and held by the UV tape, no chipping of the row bars nor contamination thereof can occur. Also, because a crown amount is measured under this state, a precise measurement can be extremely easily performed.

Figure 11:
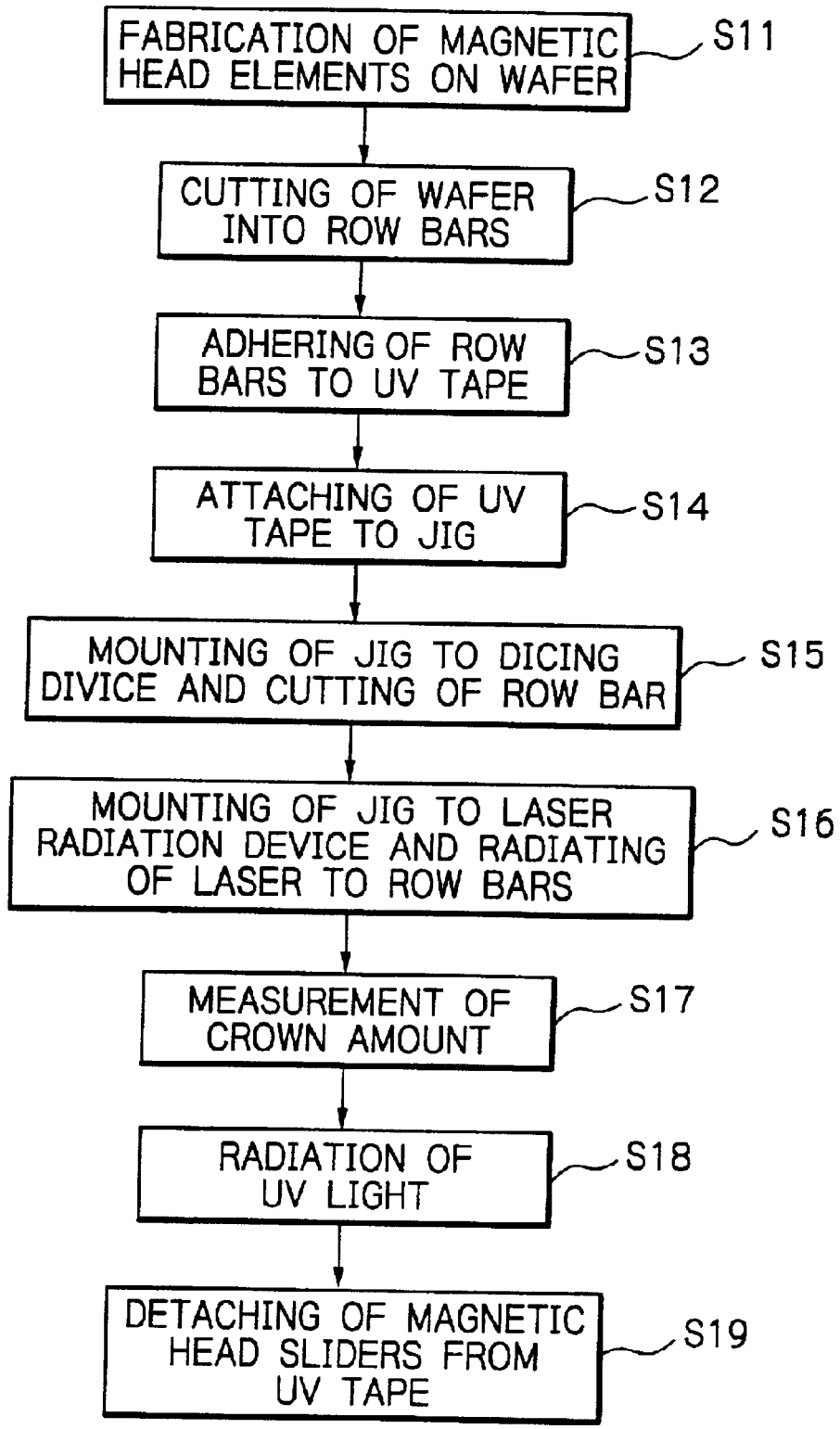
FIG. 11 shows a flow chart schematically illustrating a manufacturing method of a magnetic head slider as another embodiment according to the present invention.

FIG. 11 schematically illustrates a manufacturing method of a magnetic head slider in another embodiment according to the present invention. In this embodiment, a dicing process of row bars is carried out before a laser radiation process. Hereinafter, a method for shaping an ABS of the magnetic head slider into a convex shape and a manufacturing process of the magnetic head slider will be described with reference to the figure.

First, many magnetic head elements arranged in matrix are fabricated on an wafer by using a thin-film fabrication technique (step S11).

Then, the wafer is cut into a plurality of row bars, each of which has a plurality of aligned thin-film magnetic head elements (step S12).

Then, the plurality of row bars are adhered and fixed to a UV tape (step S13).

Next, the UV tape 50 with the stuck row bars 51 is attached to a fixing jig used for a cutting or dicing process and a laser radiation process (step S14).

Then, the fixing jig 60 is mounted on a dicing device, so that each row bar is cut and separated into individual magnetic head sliders (step S15).

Thereafter, the fixing jig is detached from the dicing device, and then mounted on a laser radiation device. A laser beam is radiated to surfaces opposite to the ABSs of the row bars via the UV tape (step S16). By applying the laser beam to only the surface opposite to the ABS, this surface is partially and momentarily heated and melted to produce a stress in this surface only. Therefore, there occurs a difference in stresses between the opposite surface and the ABS, and then a convex shape, such as, a convex crown and/or camber, is formed in each row bar. In this embodiment, because the convex shape is formed after cutting into the individual magnetic head sliders, no deformation in crown due to a distortion that may occur during the dicing process of the row bar into the individual magnetic head sliders will be produced.

Then, if necessary, a crown amount of each magnetic head slider is measured (step S17).

Thereafter, an ultraviolet light is radiated to the rear surface of the UV tape 50 to cure the adhesion layer of this UV tape (step S18).

As a result of the curing of the adhesion layer, the adhesion properties of the UV tape will be weakened, and then the magnetic head sliders 101 are detached from the UV tape 50 (step S19).

Other processes, operations and advantages in this embodiment are the same as those in the embodiment of FIG. 4.

In the aforementioned embodiments, the execution order of the process of step S3 or S13 and the process of step S4 or S14 may be inversed each other, namely, row bars may be adhered to a UV tape after the UV tape is attached to a fixing jig.

Also, instead of the UV tape, any adhesive tape that passes a laser beam there through and has adhesion properties weakened by heating may be used. In this case, similar processes, except that a heating process is performed in place of the ultra violet light radiation process, will be carried out and similar advantages will be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for shaping an air bearing surface of a magnetic head slider, comprising the steps of:

holding at least one row bar with a plurality of aligned thin-film magnetic head elements by adhering a first surface of said at least one row bar to an adhesive tape capable of passing a laser beam therethrough, said first surface being opposite to the air bearing surface of said at least one row bar;

cutting said at least one row bar into individual magnetic head sliders so that said adhesive tape holds all of the individual magnetic head sliders;

shaping the air bearing surface of said individual magnetic head slider in a convex shape by radiating the laser beam to the first surface of said magnetic head slider through said adhesive tape; and then, removing the magnetic head sliders from said adhesive tape after weakening adhesion properties of said adhesive tape.

2. The method as claimed in claim 1, wherein said method further comprises a step of measuring a crown amount of each magnetic head slider after said shaping step but before said removing step.

3. The method as claimed in claim 1, wherein said holding step includes holding a single row bar with a plurality of aligned thin-film magnetic head elements by adhering said first surface of said row bar to said adhesive tape.

4. The method as claimed in claim 1, wherein said holding step includes holding a plurality of row bars, each having a plurality of aligned thin-film magnetic head elements, by adhering said first surface of each of said row bars to said adhesive tape.

5. A method for shaping an air bearing surface of a magnetic head slider, comprising the steps of:

holding at least one row bar with a plurality of aligned thin-film magnetic head elements by adhering a first surface of said at least one row bar to a UV tape capable of passing a laser beam there through, said first surface being opposite to the air bearing surface of said at least one row bar;

cutting said at least one row bar into individual magnetic head sliders so that said UV tape holds all of the individual magnetic head sliders;

shaping the air bearing surface of said individual magnetic head slider in a convex shape by radiating the laser beam to the first surface of said magnetic head slider through said UV tape; and then, removing the magnetic head sliders from said UV tape after radiating an ultra violet light to said UV tape so as to weaken its adhesion properties.

6. The method as claimed in claim 5, wherein said method further comprises a step of measuring a crown amount of each magnetic head slider after said shaping step but before said removing step.

7. The method as claimed in claim 5, wherein said holding step includes holding a single row bar with a plurality of aligned thin-film magnetic head elements by adhering said first surface of said row bar to said UV tape.

8. The method as claimed in claim 5, wherein said holding step includes holding a plurality of row bars, each having a plurality of aligned thin-film magnetic head elements, by adhering said first surface of each of said row bars to said UV tape.

9. A manufacturing method of a magnetic head slider, comprising the steps of:
- dicing an wafer on which many of thin-film magnetic head elements are fabricated to obtain a plurality of row bars each having a plurality of aligned thin-film magnetic head elements;
- forming air bearing surfaces of magnetic head sliders on one surface of said each row bar;
- holding said row bars by adhering the other surfaces of said row bars to an adhesive tape capable of passing a laser beam there through, said the other surfaces being opposite to said air bearing surfaces;
- cutting said each row bar into individual magnetic head sliders so that said adhesive tape holds all of the individual magnetic head sliders;
- shaping the air bearing surfaces of said individual magnetic head slider in a convex shape by radiating the laser beam to the first surface of said magnetic head slider through said adhesive tape; and
- then, removing the magnetic head sliders from said adhesive tape after weakening adhesion properties of said adhesive tape.

10. The manufacturing method as claimed in claim 9, wherein said method further comprises a step of measuring a crown amount of each magnetic head slider after said cutting step but before said removing step.

11. A manufacturing method of a magnetic head slider, comprising the steps of:
- dicing a wafer on which many thin-film magnetic head elements are fabricated to obtain a plurality of row bars each having a plurality of aligned thin-film magnetic head elements;
- forming air bearing surfaces of magnetic head sliders on one surface of said each row bar;
- holding said row bars by adhering the other surfaces of said row bars to a UV tape capable of passing a laser beam therethrough, said the other surfaces being opposite said air bearing surfaces;
- cutting said each row bar into individual magnetic head sliders so that said UV tape holds all of the individual magnetic head sliders;
- shaping an air bearing surface of said individual magnetic head slider in a convex shape by radiating a laser beam to the other surface of said magnetic head slider through said UV tape; and
- then, removing the magnetic head sliders from said UV tape after radiating an ultra violet light to said UV tape so as to weaken its adhesion properties.

12. The manufacturing method as claimed in claim 11, wherein said method further comprises a step of measuring a crown amount of each magnetic head slider after said cutting step but before said removing step.

* * * * *